(12) United States Patent
Budin et al.

(10) Patent No.: US 10,837,777 B2
(45) Date of Patent: Nov. 17, 2020

(54) DEVICE AND METHOD FOR MAINTAINING THE ATTITUDE OF A CARRIER USING GYROSCOPES

(71) Applicant: SAFRAN ELECTRONICS & DEFENSE, Boulogne-Billancourt (FR)

(72) Inventors: Joël Budin, Boulogne-Billancourt (FR); Arnaud Pinturaud, Boulogne-Billancourt (FR); Arnaud Woiselle, Boulogne-Billancourt (FR); Clément Ponssard, Boulogne-Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 191 days.

(21) Appl. No.: 16/069,993

(22) PCT Filed: Jan. 16, 2017

(86) PCT No.: PCT/EP2017/050832
§ 371 (c)(1),
(2) Date: Jul. 13, 2018

(87) PCT Pub. No.: WO2017/121904
PCT Pub. Date: Jul. 20, 2017

(65) Prior Publication Data
US 2019/0033076 A1 Jan. 31, 2019

(30) Foreign Application Priority Data

Jan. 14, 2016 (FR) ...................................... 16 50288

(51) Int. Cl.
*G01C 19/5776* (2012.01)
*G01C 21/16* (2006.01)
*G01C 25/00* (2006.01)

(52) U.S. Cl.
CPC ....... *G01C 19/5776* (2013.01); *G01C 21/165* (2013.01); *G01C 25/005* (2013.01)

(58) Field of Classification Search
CPC .......................... G01C 19/5776; G01C 21/165
(Continued)

(56) References Cited

U.S. PATENT DOCUMENTS 9,170,105 B1 * 10/2015 Goodzeit ............. G01C 21/165
2010/0063763 A1 3/2010 Rozelle

FOREIGN PATENT DOCUMENTS

EP 2372656 A2 10/2011

OTHER PUBLICATIONS

Hwango, Myung, Kim, Jun-sik, Kamade, Takeo. "IMU Self-Calibration Using Factorization". IEEE Transactions on Robotics. Apr. 2013 (Year: 2013).*

(Continued)

*Primary Examiner* — Tarun Sinha
(74) *Attorney, Agent, or Firm* — Sughrue Mion, PLLC

(57) ABSTRACT

The invention relates to a device for maintaining the attitude of a carrier, the device comprising three primary gyroscopes (1, 2, 3) that are arranged to measure primary speeds of rotation (Rbc) of a carrier about three primary axes, a secondary gyroscope (4) that is arranged to measure a secondary speed of rotation (Rhp) of the carrier about a secondary axis that is different from each of the primary axes, a video camera (5) having an optical axis that is different from each of the primary axes, and a data processing module (6) that is configured to estimate scale-factor and drill errors that corrupt the primary speeds of rotation (Rbc) using data issued from the secondary speed of rotation (Rhp) and images acquired by the video camera (5), and to correct the primary speeds of rotation with said estimated errors.

16 Claims, 4 Drawing Sheets

(58) Field of Classification Search
USPC .................................................... 73/504.12
See application file for complete search history.

(56) References Cited

OTHER PUBLICATIONS

International Search Report, dated Apr. 21, 2017 from the International Bureau in counterpart International application No. PCT/EP2017/050832.
Search Report dated Oct. 10, 2016, from the French Patent Office in counterpart application No. FR1650288.
Hwangbo, M., et al., "IMU Self-Calibration Using Factorization", IEEE Transactions on Robotics, vol. 29, No. 2, 2013, pp. 493-507 (16 pages).

\* cited by examiner

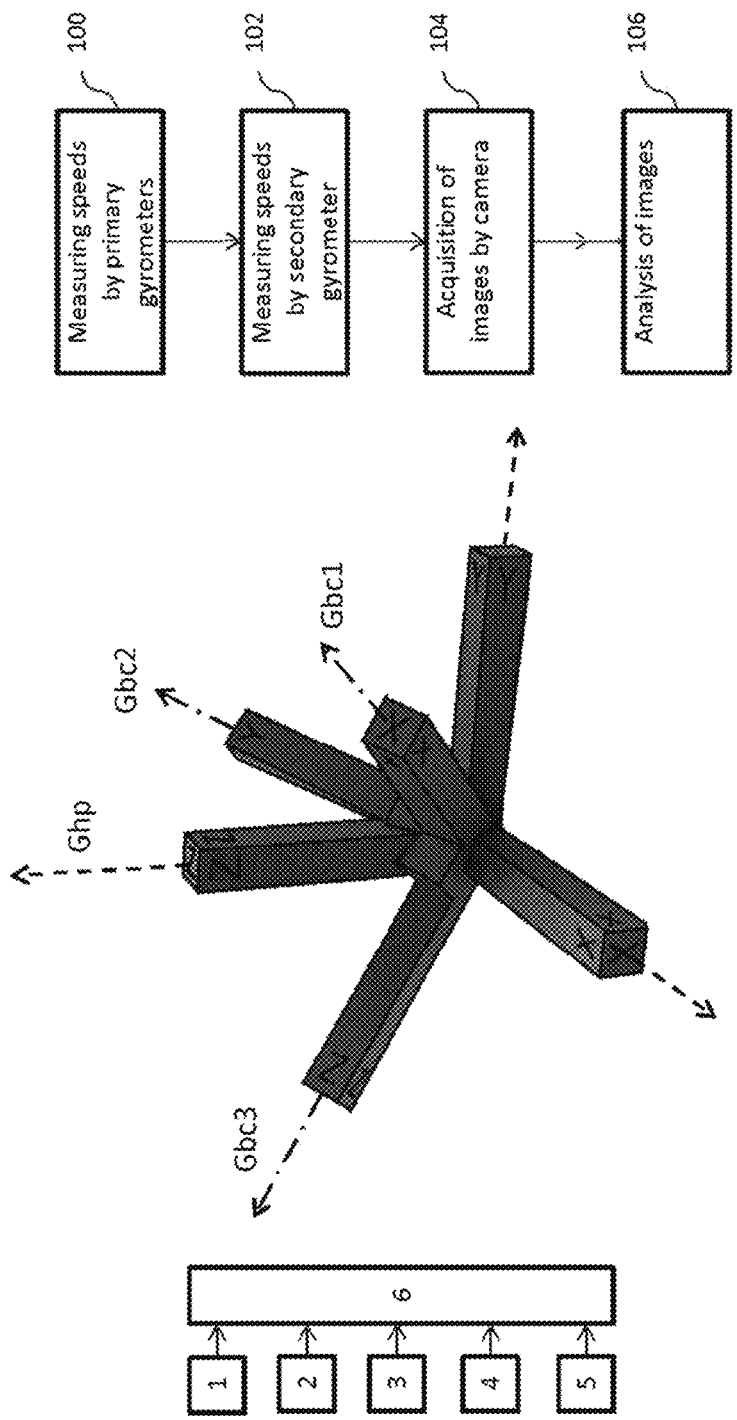

DEVICE AND METHOD FOR MAINTAINING THE ATTITUDE OF A CARRIER USING GYROSCOPES

CROSS REFERENCE TO RELATED APPLICATIONS

This application is a National Stage of International Application No. PCT/EP2017/050832, filed on Jan. 16, 2017, which claims priority from French Patent Application No. 1650288, filed on Jan. 14, 2016.

FIELD OF THE INVENTION

The present invention relates to a device and a method for maintaining the attitude of a carrier using gyroscopes.

STATE OF ART

To calculate then maintain the attitude of a carrier, it is known to use three primary gyroscopes (or "gyrometers") arranged to measure rotation speeds according to three different axes, as the carrier travels.

A heading angle, a pitch angle, and a roll angle of the carrier, which together define the attitude of the carrier in space, are calculated from the measurements acquired by the three gyroscopes.

It is also known to use a secondary gyroscope to correct scale-factor errors which jeopardize the measurements acquired by the three primary gyroscopes.

But the use of such a fourth gyroscope is not effective for correcting drift errors which jeopardize the measurements provided by the gyroscopes.

SUMMARY OF THE INVENTION

The invention therefore proposes maintaining the attitude of a carrier with improved precision relative to the solutions provided in the state of art.

According to a first aspect, a device for maintaining the attitude of a carrier is therefore provided, the device comprising:
  three primary gyroscopes arranged to measure primary rotation speeds of a carrier around three primary axes,
  a secondary gyroscope arranged to measure a secondary rotation speed of the carrier around a secondary axis different to each of the primary axes,
  a camera presenting an optical axis different to each of the primary axes,
  a data-processing module configured to
    estimate scale-factor and drift errors which jeopardize the primary rotation speeds by means of data originating from the secondary rotation speed and images acquired by the camera, and
    correct the primary rotation speeds with said estimated errors In the present invention, the camera and the secondary gyroscope combine synergistically. In fact, combining the rotation speed provided by the secondary gyroscope and images acquired by the camera corrects not only scale-factor errors which jeopardize the rotation speeds measured by the primary gyroscopes, but also corrects drift errors.

The rotation speeds measured by the primary gyroscopes are corrected more precisely than with a device with four gyroscopes.

The device according to the first aspect of the invention can be completed with the following optional characteristics taken alone or in combination when this is technically possible.

The data-processing module comprises a hybridizing filter, such as a Kalman filter, configured to estimate the scale-factor and drift errors from the data originating from the secondary rotation speed and images acquired by the camera.

The optical axis of the camera is parallel to the secondary axis.

The secondary gyroscope is selected from a type adapted to generate scale-factor errors and/or drift errors in the secondary rotation speed which are less than those generated by the primary gyroscopes in the primary rotation speeds.

The secondary gyroscope is of the hemispherical resonator type and/or the primary gyroscopes are of MEMS type.

The three primary axes are orthogonal in pairs, and the secondary axis forms an angle of 54.7 degrees with each primary axis.

According to a second aspect, a method for maintaining the attitude of a carrier is also provided, comprising steps of:
  measuring three rotation speeds of the carrier around three primary axes secant in pairs by means of three primary gyroscopes,
  measuring a rotation speed around a secondary axis secant with each of the primary axes by means of a secondary gyroscope,
the method being characterized by steps of:
  acquiring images by means of a camera presenting an optical axis different to each of the primary axes,
  estimating scale-factor and drift errors which jeopardize the primary rotation speeds by means of data originating from the secondary rotation speed and originating from the images acquired by the camera,
  correcting the primary rotation speeds with said estimated errors.

The method according to the second aspect of the invention can be completed with the following optional characteristics taken alone or in combination when this is technically possible.

The estimation of scale-factor and drift errors is performed by a hybridizing filter, such as a Kalman filter, by means of the observation data depending on a spread $\delta$ between a rotation speed depending on the secondary rotation speed, and a rotation speed of the carrier around the secondary axis deduced from the primary rotation speeds.

The rotation speed depending on the secondary rotation speed is a speed resulting from correction of the secondary rotation speed by means of the errors generated by the secondary gyroscope previously estimated by the hybridizing filter.

The method comprises the estimation of a rotation speed, so-called camera rotation speed, and which is obtained by analysis of the images acquired by the camera, the correction of scale-factor and drift errors dependent on this estimated camera rotation speed.

The estimation of scale-factor and drift errors is performed by means of observation data depending on a spread $\epsilon$ between a rotation speed depending on the camera rotation speed, and a rotation speed of the carrier viewed by the camera deduced from the primary rotation speeds.

The method also comprises steps for estimating a focal error generated by the camera, and correcting, by means of the focal error, the camera rotation speed obtained by analysis of images acquired by the camera, so as to produce a corrected camera rotation speed, wherein the rotation speed depending on the estimated camera rotation speed used to calculate the spread ε is the corrected camera rotation speed.

The method also comprises steps for calculating a confidence index on the measurement of an optical flow in the images acquired by the camera, and comparing the index with a predetermined threshold, the correction step of the primary rotation speeds being conducted or not as a function of the result of this comparison.

the primary rotation speeds Rbc are corrected by application of the following formula:

$$\begin{bmatrix} febc1 & 0 & 0 \\ 0 & febc2 & 0 \\ 0 & 0 & febc3 \end{bmatrix} \cdot Rbc - \begin{bmatrix} dbc1 \\ dbc2 \\ dbc3 \end{bmatrix}$$

where febc1, febc2, febc3 are the scale-factor errors and dbc1, dbc2 and dbc3 are the drift errors.

The method also comprises an integration step producing attitude data of the carrier from the corrected primary rotation speeds.

The method also comprises the calculation of three rotation speeds called regenerated from the following speeds: the primary correction speeds corrected by means of the estimated scale-factor and drift errors, the speed resulting from the correction of the secondary rotation speed, one of the regenerated rotation speeds being a rotation speed around the secondary axis, and wherein the attitude data of the carrier are produced by integration of the regenerated rotation speeds.

The method also comprises the steps for estimating attitude errors of the carrier, and correcting attitude data produced by means of the estimated attitude errors.

DESCRIPTION OF FIGURES

Other characteristics, aims and advantages of the invention will emerge from the following description which is purely illustrative and non-limiting and which must be considered with respect to the appended drawings, in which:

FIG. 1 schematically illustrates a device for maintaining the attitude according to an embodiment of the invention;

FIG. 2 shows the orientation in space of particular axes of the device of FIG. 1;

FIG. 3 is a flowchart of steps of a method for measuring attitude implemented by the device according to FIG. 1;

In all figures, similar elements are designated by identical reference numerals.

DETAILED DESCRIPTION OF THE INVENTION

A) Device for Maintaining Attitude

Figure 4:
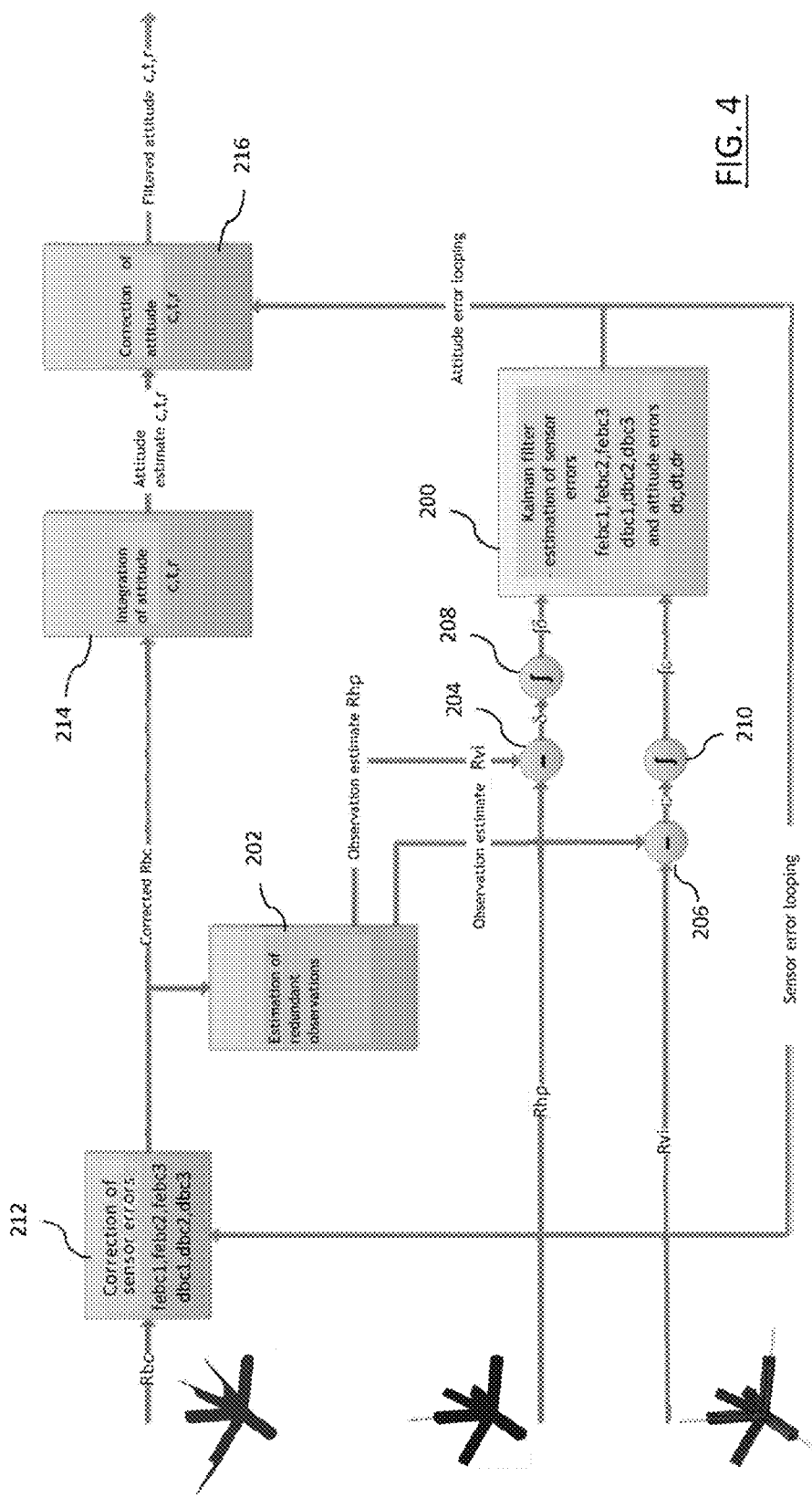
FIGS. 4, 5 and 6 are flowcharts of processing steps conducted on measurements acquired by the device of FIG. 1, according to three different embodiments of the invention.

In reference to FIG. 1, a device for maintaining the attitude of a carrier comprises three primary gyroscopes 1, 2, 3, a secondary gyroscope 4, a camera 5 and a data-processing module 6.

The three primary gyroscopes 1, 2, 3 are arranged to measure primary rotation speeds of the carrier around three different primary axes.

The three axes are for example secant in pairs. In other terms, one of the axes is not included in the plane defined by the two other axes.

The non-limiting example of primary gyroscopes 1, 2, 3 oriented such that the three primary axes are substantially orthogonal in pairs will be considered hereinbelow.

The primary gyroscopes 1, 2, 3 together conventionally form a "trihedron" of gyroscopes.

The secondary gyroscope 4 is arranged to measure a secondary rotation speed of the carrier around a secondary axis different to each of the primary axes.

The secondary gyroscope 4 is for example oriented such that its secondary axis forms the same angle with each of the primary axes, or around 54.7°. In other words, the axis of the gyroscope is oriented on a diagonal of the trihedron formed by the primary gyroscopes.

Also, the camera 5 has an optical axis different to each of the primary axes.

The data-processing module 6 is configured to produce attitude data of the carrier from the speeds measured by the gyroscopes 1, 2, 3, 4 and images acquired by the camera 5.

The data-processing module 6 comprises at least one processor configured to carry out program code instructions.

In particular, the processor of the processing module 6 is configured to execute an analysis algorithm of the content of images captured by the camera 5, for example an algorithm for measuring an optical flow in these images.

The processor of the processing module 6 is also configured to implement a hybridizing filter on the basis of data provided by the gyroscopes and the analysis algorithm.

For example, the hybridizing filter, the operation of which will be described hereinbelow, can be a Kalman filter. The Kalman filter used is preferably of extended type.

The output data of the device are the attitude data produced by the processing module 6.

The optical axis is preferably parallel to the secondary axis, which has the advantage according to the optical axis—which is the low-performance axis of the trihedron—of having the best gyrometric measurement via hybridization of gyrometric measurements (this hybridization will be detailed later). In fact, the secondary axis is preferred since the 3 primary axes contribute information redundancy whereas vice versa only the secondary axis contributes information redundancy according to each of the 3 primary axes (orthogonal to each other, by way of reminder).

Of course, the sensor errors of the primary gyroscopes have an impact on the attitude data which are produced by the data-processing module.

Any gyroscope is subject to sensor errors which jeopardize the rotation speeds it provides. These sensor errors comprise especially scale-factor errors and drift errors. In this way, gyroscopes are conventionally classified according to their precision, that is, according to the scale-factor and/or drift error value found in the measurements acquired with these gyroscopes.

In the device for maintaining attitude, the secondary gyroscope 4 is selected from a type adapted to generate scale-factor errors and/or drift errors less than those generated by the primary gyroscopes 1, 2, 3.

Hereinbelow the example of primary gyroscopes example of MEMS type is taken, that is, gyroscopes having a micromechanical vibrating structure.

Gyroscopes of "MEMS" type cause scale-factor errors and substantial drifts. In particular, the scale-factor error of a typical current MEMS gyroscope is of class 3000 to 10000 ppm. In this way, a scale-factor error of 10000 ppm causes a heading error of 1.8° for an excursion of 180°. The drift stability (low technical term of the Allan variance) is of class 10°/h.

Nevertheless, gyroscopes of MEMS type have the advantage of being cheap and highly compact. Furthermore, despite the relatively high value of their scale-factor errors they can be corrected efficiently by the secondary gyroscope, when the latter is selected to have a better accuracy.

The secondary gyroscope is for example a hemispherical resonator gyroscope (HRG).

B) General Correction Principle of Scale-Factor Errors of Primary Gyroscopes by Means of the Secondary Gyroscope The theoretical operating principle of the device for maintaining attitude is presented hereinbelow.

The four gyroscopes 1, 2, 3, 4 together define a heterogeneous inertial architecture.

The secondary gyroscope 4 is configured to observe a mix of errors which jeopardize the measurements acquired by the primary gyroscopes 1, 2, 3. This concept accesses inter alia a linear combination of scale factors generated by the primary gyroscopes 1, 2, 3, 4 when the carrier [p] is in rotation motion, that is, when the scale-factor errors are dominant.

In a non-limiting way but to simplify presenting the general principle correction of scale-factor errors in the measurements taken by the gyroscope, it is considered that the rotation speed measurement measured by the secondary gyroscope 4, noted Rhp, is jeopardized by a negligible error.

The trihedron formed by the three primary gyroscopes 1, 2, 3 of axes {Gbc1, Gbc2, Gbc3} takes measurements of rotation speeds $$Rbc = \begin{bmatrix} Rbc1 \\ Rbc2 \\ Rbc3 \end{bmatrix}.$$

A virtual orthonormated system of origin GO and axes {G1, G2, G3} is defined whereof the cube diagonal is exactly the axis Ghp. The true rotation speeds according to the three axes of this perfect trihedron are noted $$R = \begin{bmatrix} R1 \\ R2 \\ R3 \end{bmatrix}.$$

There is:

$$Rhp = \frac{[1\ 1\ 1] \cdot R}{\sqrt{3}} \quad (1)$$

Furthermore, the three axes {Gbc1, Gbc2, Gbc3} are not combined with the axes of the trihedron {G1, G2, G3}. The three gyroscopes 1, 2, 3 oriented along the axes {Gbc1, Gbc2, Gbc3} take jeopardized measurements of a scale-factor error and a drift error.

Note Kbc the matrix 3×3 containing on its diagonal the corrections of the scale-factor errors and out of diagonal the correction terms of setting errors of the axes {Gbc1, Gbc2, Gbc3} relative to the axes {G1, G2, G3}.

$$Kbc = \begin{bmatrix} 1+febc1 & cbc12 & cbc13 \\ cbc21 & 1+febc2 & cbc23 \\ cbc31 & cbc32 & 1+febc3 \end{bmatrix}$$

And note $$dbc = \begin{bmatrix} dbc1 \\ dbc2 \\ dbc3 \end{bmatrix}$$

the column vector containing the terms of drift of the three primary gyroscopes 1, 2, 3.

There is the following equation connecting the true rotations R to the measured rotations Rbc:

$$Kbc.Rbc-dbc=R \quad (2)$$

Furthermore let δ be defined as a spread between the measurement Rhp taken by the secondary gyroscope 4, and equivalent information deduced from the measurements provided by the trihedron of primary gyroscopes 1, 2, 3:

$$\delta = Rhp - \frac{[1\ 1\ 1] \cdot Rbc}{\sqrt{3}} = \frac{[1\ 1\ 1] \cdot R}{\sqrt{3}} - \frac{[1\ 1\ 1] \cdot Rbc}{\sqrt{3}} \quad (3)$$

Hence, by injecting (2) in (3):

$$\delta = \frac{[1\ 1\ 1] \cdot [Kbc.Rbc - dbc]}{\sqrt{3}} - \frac{[1\ 1\ 1] \cdot Rbc}{\sqrt{3}}$$

Thus:

$$\delta = Rbc^T \cdot \begin{bmatrix} febc1+kbc21+kbc31 \\ febc2+kbc12+kbc32 \\ febc3+kbc13+kbc23 \end{bmatrix} - [1\ 1\ 1] \cdot dbc$$

At a later stage, given that the scale factor correctors febc1, febc2, febc3 are of class 3000 ppm, and the settings are known at 0.5 milliradians, and the drift terms are of class 20°/h or 0.005°/s, when one or more of the rotations Rbc exceeds class 10°/s the approximation can be made:

$$\delta = Rbc^T \cdot \begin{bmatrix} febc1 \\ febc2 \\ febc3 \end{bmatrix} \quad (4)$$

Later on, if several realisations are stacked in a column, this results in an overdetermined system:

$$\Delta = A \cdot \begin{bmatrix} febc1 \\ febc2 \\ febc3 \end{bmatrix}$$

where Δ is a column stack of several realisations of δ, and A a column stack of several realisations of the line vector $Rbc^T$.

The preceding elements show that it is therefore possible to identify, by the drift errors and settings of axes almost overlooked in the equation (4), the scale factors of the primary gyroscopes 1, 2, 3 due to the secondary gyroscope 4.

C) General Correction Principle of Drift Errors of Primary Gyroscopes by Means of the Camera In addition to the four gyroscopes 1, 2, 3, 4, adding the camera 5 increases the performance of the device for maintaining attitude.

The camera 5 is configured to be used as ego-movement sensor, by the use of a resolution algorithm of the overall optical flow of the images captured by the camera 5.

It will be clear hereinbelow that the camera 5 supplies vision information Rvi which is combined with the measurements provided by the gyroscopes 1, 2, 3, 4.

The measurement algorithm of the overall optical flow used by the camera 5 provides a confidence index on its measurement, modulating its influence on the attitude solution as a function of its availability: exploitable content in the images, likelihood of the result obtained. Specifically, the quantity of exploitable pixels in the image is analyzed, as is the value of the image formed by subtraction of the two recalibrated images.

In an embodiment, the vision observation Rvi can or cannot be considered as a function of comparison with a predefined threshold of this confidence index of the measured optical flow.

It is considered that the camera 5 takes a measurement devoid of drift error: the measurement is taken between pairs of images; one of the two images is called "reference", and the other "test". The "test" image is the current image.

The "reference" image is changed only when this is necessary, and typically stays unchanged in a scene observation phase with small movements (under a quarter of the viewing field). In practice it is considered that the "reference" changes seldom enough for the drift in the rotation movement measurement to be overlooked by the camera 5.

An orthonormated system of origin V0 and axes {V1, V2, V3}, with V0 being the optical centre and V1 being the optical axis will be considered. It should be noted that this axis is colinear to the high-performance gyro axis Ghp defined previously as almost a translation corresponding to the spread between the origin of the system GO and the origin of the system V0.

It is considered that the orthonormated system {V0, V1, V2, V3} is the system attached to the carrier [p]. In terms of maintaining the attitude of said device, the heading, pitch and roll $$\begin{bmatrix} c \\ t \\ r \end{bmatrix}$$

are calculated and allow a system change between the system of the carrier [p] and the local geographical system [g]. Tgp will be noted as the system change matrix from [g] to [p], resulting directly from $$\begin{bmatrix} c \\ t \\ r \end{bmatrix}$$

and which will not be detailed further here.

The trihedron formed by the secondary axis and the camera {Gvi1, Gvi2, Gvi3} takes measurements of rotation speeds $$Rvi = \begin{bmatrix} Rvi1 \\ Rvi2 \\ Rvi3 \end{bmatrix}.$$

Rvi here is a vector of rotation speeds comprising 3 components, one component of which is a rotation speed around the optical axis.

Let Kvi be the matrix 3×3 containing on its diagonal the corrections of scale-factor errors and out of diagonal the terms of setting error correction of the vision axes {Gvi1, Gvi2, Gvi3} relative to the axes {V1, V2, V3}.

$$Kvi = \begin{bmatrix} 1+fevi1 & cvi12 & cvi13 \\ cvi21 & 1+fevi2 & cvi23 \\ cvi31 & cvi32 & 1+fevi3 \end{bmatrix}$$

It should be noted that the matrix of pixels is considered as perfectly square and known, implying that the scale-factor errors according to the axes V1 and V2 are identical and equal to not knowing the focal distance.

It should be noted that the camera 5 measures rotations relative to the terrestrial system and not relative to the inertial reference such as gyroscopes. Let Rt be the terrestrial rotation vector expressed—and known—in the system [g].

There is the following equation connecting the true inertial rotations V in the system {V0, V1, V2, V3} to the measured rotations Rvi:

$$Kvi.Rvi = V - Tgp^T.Rt \qquad (5)$$

The trihedron {V1, V2, V3} is created by applying three rotations to the virtual trihedron {G1, G2, G3} defined earlier:

rotation of 45° according to G3 to form a trihedron to be called {G1bis, G2bis, G3bis} rotation of $$-\operatorname{atan}\left(\frac{1}{\sqrt{2}}\right) \approx 35.26°$$

according to G2bis to form the trihedron {G1ter, G2ter, G3ter} then rotation of 165° according to G1ter to form the trihedron {V1, V2, V3}

The relation between the true inertial rotations V in the virtual system vision {V0, V1, V2, V3} and the true rotations R in the virtual inertial system {GO, G1, G2, G3} is:

$$R = Tgyvi \cdot V \qquad (6)$$

$$\text{Where } Tgyvi = \begin{bmatrix} 0.5744 & 0.5744 & 0.5744 \\ 0.5744 & -0.7887 & 0.2113 \\ 0.5744 & 0.2113 & -0.7887 \end{bmatrix}$$

Now ε is defined as the spread between the measurement $$Rvi = \begin{bmatrix} Rvi1 \\ Rvi2 \\ Rvi3 \end{bmatrix}$$

taken by the trihedron vision, and the equivalent information reconstituted by the trihedron of primary gyroscopes:

$$\varepsilon = Tgyvi^T \cdot Rbc - Tgp^T \cdot Rt - Rvi$$

$$\varepsilon = Tgyvi^T \cdot Rbc - Tgp^T \cdot Rt - \frac{(Tgyvi^T(Kbc \cdot Rbc - dbc) - Tgp^T \cdot Rt)}{Kvi}$$

Now considering that $$Kvi = Id + \begin{bmatrix} fevi1 & cvi12 & cvi13 \\ cvi21 & fevi2 & cvi23 \\ cvi31 & cvi32 & fevi3 \end{bmatrix} = Id + kvi, \text{ and}$$

$$Kbc = Id + \begin{bmatrix} febc1 & cbc12 & cbc13 \\ cbc21 & febc2 & cbc23 \\ cbc31 & cbc32 & febc3 \end{bmatrix} = Id + kbc,$$

and the limited development $$\frac{1}{Kvi} = ID - kvi$$

$$\varepsilon = Tgyvi^T.Rbc - Tgp^T.Rt - (Id-kvi).(Tgyvi^T((Id+kbc). Rbc-dbc) - Tgp^T.Rt) \quad (7)$$

A use phase of the apparatus with low attitude movements is now considered, typically an observation phase of a fixed point of the landscape, and the summation for example over 10 s of ε. It will be considered that over 10 s the variation in attitude does not exceed 0.1°. This means that over all of ε the terms of Rbc do not exceed class 50°/h, implying that the terms of the second order produced between the terms of the matrices kbc and kvi which do not exceed 0.01, and the terms of Rbc, do not exceed 0.5°/h. In the same way, the terrestrial rotation of 15°/h multiplied by terms kvi are of class 0.15°/h. These values are to be contrasted with the values of drifts of low-cost gyroscopes, of class 20°/h. In the equation (7) the terms of the second and third order $Tgyvi^T.kbc$. Rbc, $kvi.Tgyvi^T.Rbc$, $kvi.Tgyvi^T.kbc$. Rbc, $kvi.Tgyvi^T.dbc$, and finally $kvi.Tgp^T.Rt$, can be overlooked to produce:

$$\varepsilon = Tgyvi^T.dbc \quad (8)$$

In other words, comparison of the vision measurement and of the equivalent information reconstituted by the primary gyroscopes observes the terms of drifts of the primary gyroscopes, in the equation (8) overlooking the terms of the second order dependent on the rotation speeds and the setting errors of the trihedron.

D) Method for Maintaining the Attitude of a Carrier

The general principles explained in sections B) and C) above can be used to implement a method for maintaining attitude executed by the maintaining device schematically illustrated in FIGS. 1 and 2.

The attitude of the carrier [p] is depicted as the vector comprising rotations of heading, pitch and roll $$\begin{bmatrix} c \\ t \\ r \end{bmatrix}.$$

In reference to FIG. 3, in a step 100, the three primary gyroscopes 1, 2, 3 measure the three rotation speeds Rbc1, Rbc2, Rbc3 of the carrier around the three primary axes. These speeds are combined in the vector $$Rbc = \begin{bmatrix} Rbc1 \\ Rbc2 \\ Rbc3 \end{bmatrix}.$$

Furthermore, in a step 102 the secondary gyroscope 4 measures a rotation speed Rhp of the carrier around its secondary axis, which is secant with each of the primary axes.

In a step 104, the camera 5 acquires images.

In a step 106, analysis of the images captured by the camera 5 is implemented so as to produce an estimation of the rotation speed of the carrier in space in the forms of the vector $$Rvi = \begin{bmatrix} Rvi1 \\ Rvi2 \\ Rvi3 \end{bmatrix}.$$

Analysis of the images can be implemented by means of a measurement algorithm of an optical flow in these images, as indicated previously in section C).

The following rotation data are transmitted to the processing module 6:
Rbc (provided by the primary gyroscopes 1, 2, 3),
Rhp (provided by the secondary gyroscope 4),
Rvi (originating from the analysis of images captured by the camera 5).

These data are processed by the processing module 6 to produce a measurement of the attitude of the carrier.

In a first processing embodiment illustrated in FIG. 4, the processing module 6 applies the following treatments.

The processing module 6 estimates 200 the scale-factor and drift errors which jeopardize the primary rotation speeds, by means of the secondary rotation speed Rhp and the data Rvi originating from the images acquired by the camera 5.

Estimation 200 of scale-factor and drift errors is carried out by the hybridizing filter executed by at least one processor of the processing module 6.

The hybridizing filter also provides an estimation of attitude error: a heading error dc, a roll error dr, and a pitch error dt.

In a step 202, the processing module 6 calculates a secondary rotation speed of the carrier around the secondary axis from the primary rotation speeds Rbc, this speed calculated in this way constituting redundant information relative to the rotation speed Rhp provided by the secondary gyroscope 4.

In the event where the primary axes are orthogonal in pairs and where the secondary axis is oriented diagonally relative to the primary axes, this redundant speed is expressed as $$\frac{[1\ 1\ 1] \cdot Rbc}{\sqrt{3}},$$

as indicated previously in section B.

Moreover, the processing module 6 calculates a vector rotation speed of the camera 5, from the primary rotation speeds Rbc, constituting redundant information relative to the speed Rvi, obtained by analysis of images captured by the camera 5.

In a step 204, the processing module 6 calculates the spread δ between the secondary rotation speed measured by the secondary gyroscope 4 and the estimated secondary rotation speed constituting redundant information.

In a step 206, the processing module 6 calculates the spread ε between the rotation speed around the optical axis of the camera 5, deduced from the images captured by the latter, and the redundant rotation speed around the same optical axis, estimated by means of the primary speed measurements Rbc.

In the event where the primary axes are orthogonal in pairs and where the secondary axis is oriented diagonally relative to the primary axes, the spread ε can be calculated as per the formula (7) mentioned previously in section C).

The spreads of speed δ and ε are integrated temporally in steps 208 and 210, then the results ∫δ and ∫ε of these temporal integrations are used by the hybridizing filter to estimate 200 the scale-factor errors and the drift errors which jeopardize the primary rotation speed measurements.

As pointed out previously, the hybridizing filter can be a Kalman filter, which is an estimator simple to execute.

In a particular embodiment, this Kalman filter executes the following evolution and observation equations:

$$\begin{cases} \dot{X} = F(X) \cdot X \\ Y = H(X) \cdot X \end{cases}$$

Where X is a status vector comprising three attitude errors dc, dt, dr, six sensor errors (that is, the three scale-factor errors febc and the three drift errors dbc) and the time integral of the two spreads δ and ε defined previously.

$$X = \begin{bmatrix} dc \\ dt \\ dr \\ febc1 \\ febc2 \\ febc3 \\ dbc1 \\ dbc2 \\ dbc3 \\ \int \delta \\ \int \varepsilon 1 \\ \int \varepsilon 2 \\ \int \varepsilon 3 \end{bmatrix}$$

The evolution matrix F(X) is expressed:

$$F(X) = \begin{bmatrix} \sim & \sim & \sim & \sim & \sim & \sim & \sim & \sim & \sim & \sim & \sim \\ \sim & \sim & \sim & \sim & \sim & \sim & \sim & \sim & \sim & \sim & \sim \\ \sim & \sim & \sim & \sim & \sim & \sim & \sim & \sim & \sim & \sim & \sim \\ 0 & 0 & 0 & 0 & 0 & 0 & 0 & 0 & 0 & 0 & 0 \\ 0 & 0 & 0 & 0 & 0 & 0 & 0 & 0 & 0 & 0 & 0 \\ 0 & 0 & 0 & 0 & 0 & 0 & 0 & 0 & 0 & 0 & 0 \\ 0 & 0 & 0 & 0 & 0 & 0 & 0 & 0 & 0 & 0 & 0 \\ 0 & 0 & 0 & 0 & 0 & 0 & 0 & 0 & 0 & 0 & 0 \\ 0 & 0 & 0 & 0 & 0 & 0 & 0 & 0 & 0 & 0 & 0 \\ 0 & 0 & 0 & Rbc1 & Rbc2 & Rbc3 & 0 & 0 & 0 & 0 & 0 \\ 0 & 0 & 0 & 0 & 0 & 0 & 1 & 0 & 0 & 0 & 0 \\ 0 & 0 & 0 & 0 & 0 & 0 & 0 & 1 & 0 & 0 & 0 \\ 0 & 0 & 0 & 0 & 0 & 0 & 0 & 0 & 1 & 0 & 0 \end{bmatrix}$$

The terms here noted ~ of the evolution matrix F(X) can easily be determined by the skilled person. These terms contain the dependences on the variations in attitude errors relative to the attitude errors themselves and the sensor errors.

The observation vector Y of the Kalman filter directly contains all the observations of redundancy formed by the spreads δ and ε:

$$Y = \begin{bmatrix} \int \delta \\ \int \varepsilon 1 \\ \int \varepsilon 2 \\ \int \varepsilon 3 \end{bmatrix}$$

Finally, the status observation transition matrix H is expressed:

$$H(X) = \begin{bmatrix} 0 & 0 & 0 & 0 & 0 & 0 & 0 & 1 & 0 & 0 & 0 \\ 0 & 0 & 0 & 0 & 0 & 0 & 0 & 0 & 1 & 0 & 0 \\ 0 & 0 & 0 & 0 & 0 & 0 & 0 & 0 & 0 & 1 & 0 \\ 0 & 0 & 0 & 0 & 0 & 0 & 0 & 0 & 0 & 0 & 1 \end{bmatrix}$$

After the estimation step 200 conducted by means of the hybridizing filter, the processing module 6 corrects 212 the speed data Rbc by means of the scale-factor and drift error estimations produced by this hybridizing filter.

This correction 212 is typically executed by application of the following formula:

$$\begin{bmatrix} febc1 & 0 & 0 \\ 0 & febc2 & 0 \\ 0 & 0 & febc3 \end{bmatrix} \cdot Rbc - \begin{bmatrix} dbc1 \\ dbc2 \\ dbc3 \end{bmatrix}$$

The result of this formula constitutes a vector of corrected primary speeds relative to the primary speeds Rbc provided by the trihedron of primary gyroscopes.

In an embodiment, calculations of redundant information allowing to end up with the spreads δ and ε are not performed on the basis of speed data Rbc directly provided by the primary gyroscopes (and therefore jeopardized by scale-factor and drift sensor errors), but on the basis of corrected primary speeds.

In other terms, the hybridizing filter functions by means of looping of the sensor errors of the primary gyroscopes 1, 2, 3.

In a step 214, the processing module integrates the corrected rotation speeds obtained via the correction step 212, so as to create a first estimate $$\begin{bmatrix} c \\ t \\ r \end{bmatrix}$$

of the attitude of the carrier.

In a step 216, the processing module 6 applies correction processing of this first attitude estimate by means of the attitude errors dc, dr, dt produced by the hybridizing filter. In other terms, looping of attitude errors is performed by the Kalman filter.

The correction processing of the step 216 produces a filtered attitude of the carrier, more accurate than the first estimate of this attitude.

The Kalman filter carries out looping of the sensor errors and attitude integration errors, at a frequency slower than the attitude integration frequency. During loopback, the terms of the status vector X are reset to zero.

It should be noted that the confidence index of the vision measurement Rvi is not shown in FIG. 4. Simple execution can consist of ignoring the vision measurement Rvi in the process when the confidence index of measurement of the optical flow crosses a predetermined threshold. In this case, there is no vision observation Rvi available, and the Kalman filter "waits for" the next available observation for corrections of attitude errors and sensor errors dependent on vision.

In the embodiment illustrated in FIG. 4, the hybridizing filter used is relatively simple. Yet, a more elaborate hybridizing filter can be constructed, with a status vector X containing all the errors of all the sensors used (gyroscopes 1, 2, 3, 4 and camera 5), drifts, scale factors and axis settings, and by constructing the evolution matrix F(X) with all the corresponding interdependencies. Correction of sensor errors and overall attitude, coherent and optimal is now worked out. In particular, it can be pertinent in an embodiment to also estimate the focal error of the camera 5.

Figure 5:
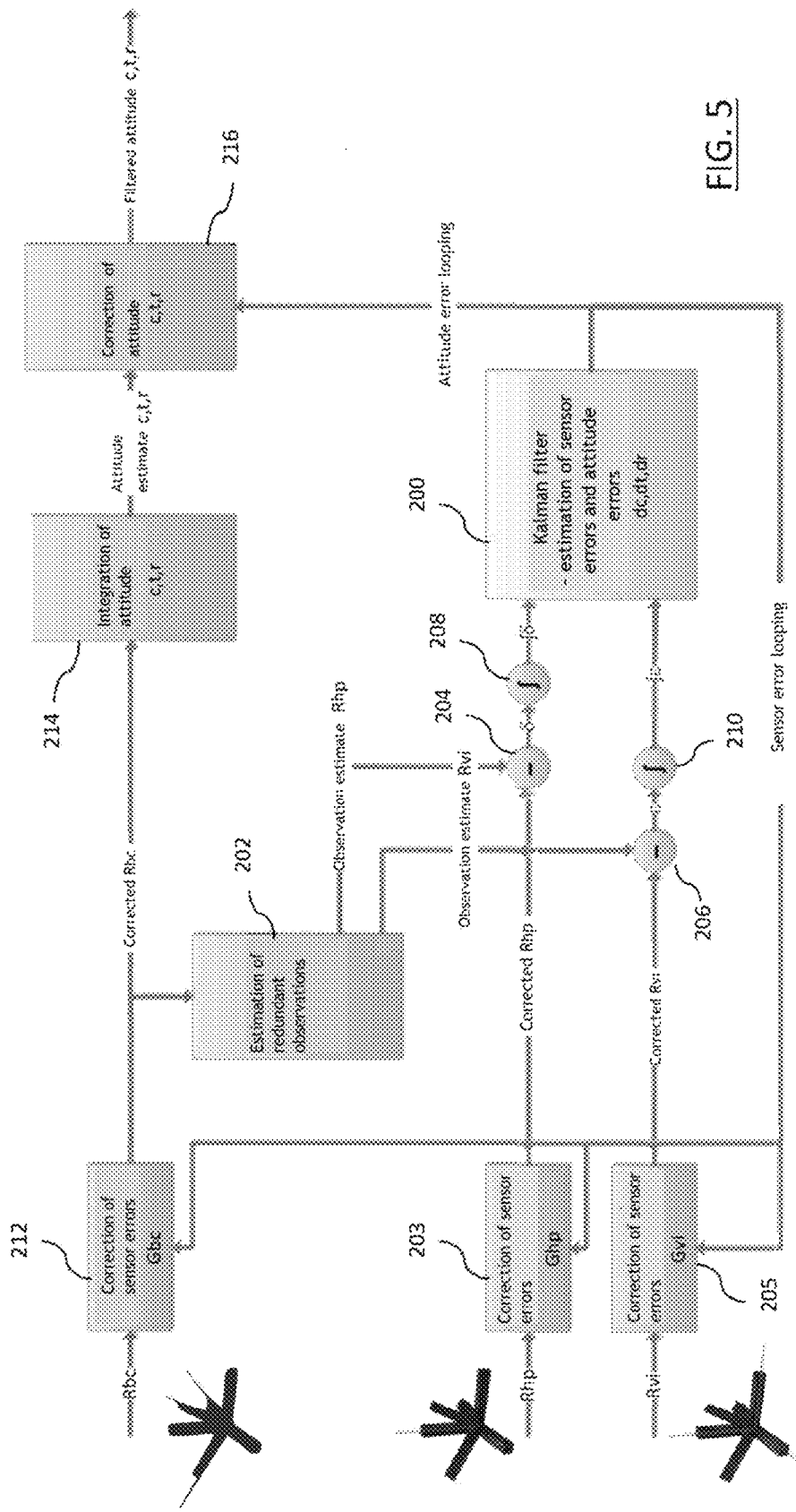

In application of this principle, FIG. 5 illustrates the steps of a method wherein the status vector of the Kalman filter comprises not only the scale-factor and drift errors of the primary gyroscopes, but also the scale-factor and drift errors of the secondary gyroscope.

The method according to this second embodiment differs from that illustrated in FIG. 4 by the following additional steps.

In a step 203, the processing module corrects the secondary speed measurement Rhp provided by the secondary gyroscope by means of the scale-factor and drift errors relative to this secondary gyroscope which were previously estimated by the hybridizing filter. The result of this correction step is a corrected secondary rotation speed.

The spread δ calculated in the step 204 by the processing module is the spread between the corrected secondary rotation speed and the redundant secondary rotation speed.

In other terms, the rotation speed measured by the secondary gyroscope 4 used in the first embodiment illustrated in FIG. 4 to calculate the spread δ is replaced in the second embodiment illustrated in FIG. 5 by the corrected secondary rotation speed.

Similarly, in a step 205, the processing module 6 corrects the measurement of rotation speed Rvi (which comprises, by way of reminder, 3 components including a rotation component around the optical axis) coming from the camera 5, by means of the errors generated by the camera 5 (for example a focal error of the camera 5) which were previously estimated 200 by the hybridizing filter. The result of this correction step is a corrected camera rotation speed.

The spread ε calculated by the processing module in the step 206 is the spread between the corrected rotation speed and the redundant secondary rotation speed.

In other terms, the camera rotation speed, used in the first embodiment illustrated in FIG. 4 to calculate the spread ε, is replaced in the second embodiment illustrated in FIG. 5 by a corrected camera rotation speed.

Figure 6:
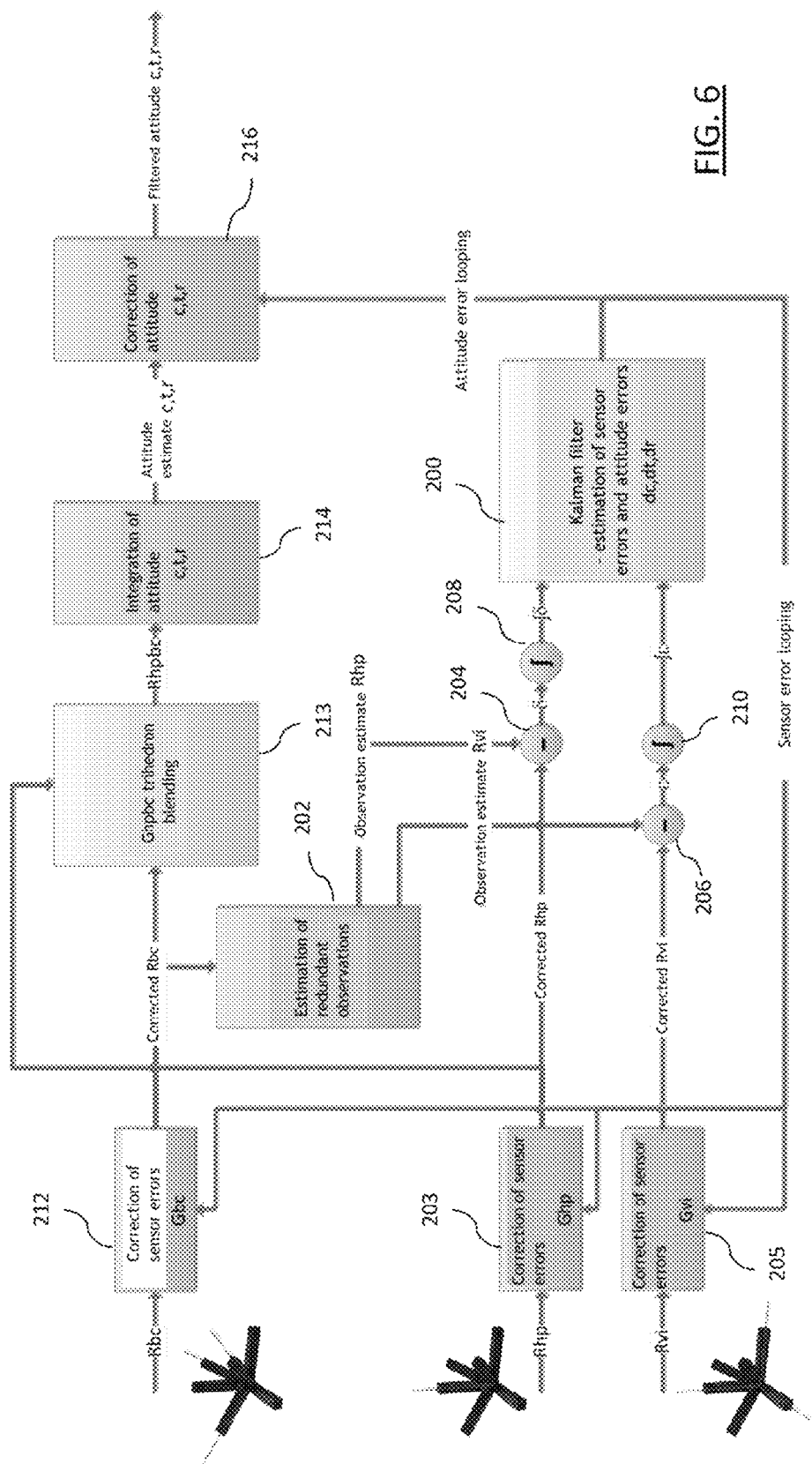

In a third embodiment illustrated in FIG. 6, additional processing 213 is implemented between the correction steps 102 of the scale-factor and drift errors which jeopardize the primary measurements of rotation speed, and the integration step 214.

This additional processing 213 is generating of an inertial trihedron from the secondary rotation speed corrected via the correction step 212.

This inertial trihedron is composed of the secondary axis and two other axes orthogonal with the secondary axis.

The generating processing 213 produces a vector of three rotation speeds Rhpbc, which form the object of the integration 214 in place of the corrected primary rotation speeds Rbc to obtain the attitude data c, t, r.

In this way, the qualities of the secondary axis Ghp are exploited directly in the attitude integration 214, effectively improving the precision of the attitude solution obtained, above all in the trajectories for which this axis is mostly excited.

The table below summarizes the advantages and disadvantages of the different elements of the device for maintaining the attitude according to the invention, and how these elements synergize with each other when combined according to the invention.

Each element of the device for maintaining attitude is more or less effective, which relates to:
- its capacity to produce data jeopardized by scale-factor errors as low as possible;
- its capacity to produce data jeopardized by drift errors as low as possible;
- its availability, that is, its capacity to produce data continuously (high availability) or only intermittently (low availability).

This table shows that the combination of primary gyroscopes, secondary gyroscope and camera offers effective protection against scale-factor and drift errors, while being capable of providing attitude estimations continuously.

| | Protection against scale-factor errors? | Protection against drift errors? | Availability? |
|---|---|---|---|
| Primary gyroscopes (3 axes) | Low | Low | High |
| Secondary gyroscope (1 axis) | High | High | High |
| Camera (3 axes) | Low | High for 2 axes Low for 1 axis | Low |
| Camera + Secondary gyroscope | High | High on 2 axes, Low on 1 axis | Low |
| Primary gyroscopes + Secondary gyroscope ("diacube") | High | High on 1 axis, Low on 2 axes | High |

-continued

| | Protection against scale-factor errors? | Protection against drift errors? | Availability? |
|---|---|---|---|
| Camera + Primary gyroscopes + Secondary gyroscope | High | High | High |

The invention claimed is:

1. A device for maintaining the attitude of a carrier, the device comprising:
three primary gyroscopes arranged to measure primary rotation speeds of a carrier around three primary axes,
a secondary gyroscope arranged to measure a secondary rotation speed of the carrier around a secondary axis different to each of the primary axes, wherein the secondary gyroscope is selected from a type adapted to generate scale-factor errors and/or drift errors in the secondary rotation speed which are less than those generated by the primary gyroscopes in the primary rotation speeds,
a camera presenting an optical axis different to each of the primary axes,
a data-processing module configured to
estimate scale-factor and drift errors which jeopardize the primary rotation speeds from data originating from the secondary rotation speed and images acquired by the camera, and
correct the primary rotation speeds with said estimated errors.

2. The device according to claim 1, wherein the data-processing module comprises a hybridizing filter, such as a Kalman filter, configured to estimate the scale-factor and drift errors from the data originating from the secondary rotation speed and images acquired by the camera.

3. The device according to claim 1, wherein the optical axis of the camera is parallel to the secondary axis.

4. The device according to claim 1, wherein the secondary gyroscope is of the hemispherical resonator type and/or the primary gyroscopes are of MEMS type.

5. The device according to claim 1, wherein the three primary axes are orthogonal in pairs, and the secondary axis forms an angle of 54.7° degrees with each primary axis.

6. A method for maintaining the attitude of a carrier, comprising:
measuring, by three primary gyroscopes, three rotation speeds of the carrier around three primary axes,
measuring, by a secondary gyroscope, a rotation speed around a secondary axis different to each of the primary axes,
acquiring images by means of a camera having an optical axis different to each of the primary axes,
estimating a camera rotation speed by analysis of the images acquired by the camera, wherein the correction of scale-factor and drift errors depend on the camera rotation speed
estimating scale-factor and drift errors which jeopardize the primary rotation speeds from data originating from the secondary rotation speed and originating from the images acquired by the camera, wherein estimating the scale-factor and drift errors is performed by means of observation data depending on a spread E between:
a rotation speed depending on the camera rotation speed, and
a rotation speed of the carrier viewed by the camera, which is deduced from the primary rotation speeds,
correcting the primary rotation speeds with said estimated errors.

7. The method according to claim 6, wherein estimating the scale-factor and drift errors is performed by a hybridizing filter, such as a Kalman filter, which uses observation data depending on a spread δ between:
a rotation speed depending on the secondary rotation speed, and
a rotation speed of the carrier around the secondary axis deduced from the primary rotation speeds.

8. The method according to claim 7, wherein the rotation speed depending on the secondary rotation speed is a speed resulting from a correction of the secondary rotation speed by means of the errors generated by the secondary gyroscope previously estimated by the hybridizing filter.

9. The method according to claim 6, wherein the correction of scale-factor and drift errors depend on the camera rotation speed.

10. The method according to claim 9, also comprising:
estimating a focal error generated by the camera,
correcting, by means of the focal error, the camera rotation speed obtained by analysis of images acquired by the camera, so as to produce a corrected camera rotation speed,
wherein the rotation speed depending on the camera rotation speed used to calculate the spread ε is the corrected camera rotation speed.

11. The method according to claim 6, also comprising:
calculating a confidence index on the measurement of an optical flow in the images acquired by the camera,
comparing the index with a predetermined threshold,
wherein correcting the primary rotation speeds is conducted or not as a function of the result of this comparison.

12. The method according to claim 6, wherein the primary rotation speeds Rbc are corrected by application of the following formula:

$$\begin{bmatrix} febc1 & 0 & 0 \\ 0 & febc2 & 0 \\ 0 & 0 & febc3 \end{bmatrix} \cdot Rbc - \begin{bmatrix} dbc1 \\ dbc2 \\ dbc3 \end{bmatrix}$$

where febc1, febc2, febc3 are the scale-factor errors and dbc1, dbc2 and dbc3 are the drift errors.

13. The method according to claim 6, also comprising an integration step producing attitude data of the carrier from the corrected primary rotation speeds.

14. The method according to claim 13, wherein the rotation speed depending on the secondary rotation speed is a speed resulting from a correction of the secondary rotation speed by means of the errors generated by the secondary gyroscope previously estimated by the hybridizing filter, wherein the method further comprises calculating three regenerated rotation speeds called from:
the primary rotation speeds corrected by means of the estimated scale-factor and drift errors,
the speed resulting from the correction of the secondary rotation speed,
wherein one of the regenerated rotation speeds is a rotation speed around the secondary axis, and wherein the attitude data of the carrier are produced by integration of the regenerated rotation speeds.

15. The method according to claim 13, also comprising:
estimating attitude errors of the carrier,
correcting attitude data produced by means of the estimated attitude errors.

16. A method for maintaining the attitude of a carrier, the method comprising:
- measuring, by three primary gyroscopes, three rotation speeds of the carrier around three primary axes,
- measuring, by a secondary gyroscope, a rotation speed around a secondary axis different to each of the primary axes, wherein the secondary gyroscope is selected from a type adapted to generate scale-factor errors and/or drift errors in the secondary rotation speed which are less than those generated by the primary gyroscopes in the primary rotation speeds,
- acquiring images by means of a camera having an optical axis different to each of the primary axes,
- estimating scale-factor and drift errors which jeopardize the primary rotation speeds from data originating from the secondary rotation speed and originating from the images acquired by the camera,
- correcting the primary rotation speeds with said estimated errors.

* * * * *